Feb. 5, 1924.
J. WHYEL
TRACTOR BRAKE
Filed Oct. 15, 1921
1,482,877
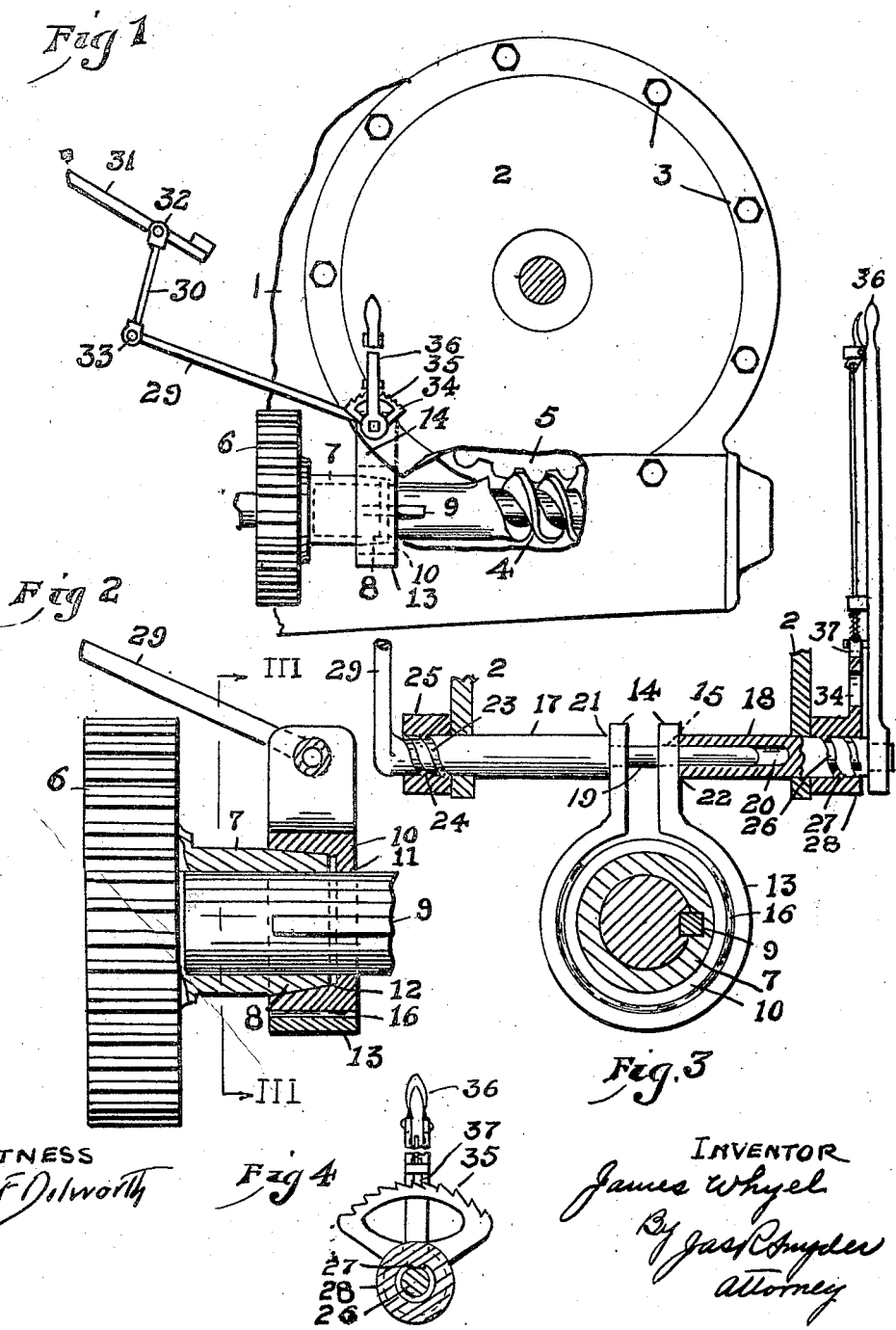

Patented Feb. 5, 1924.

1,482,877

UNITED STATES PATENT OFFICE.

JAMES WHYEL, OF PITTSBURGH, PENNSYLVANIA.

TRACTOR BRAKE.

Application filed October 15, 1921. Serial No. 507,856.

*To all whom it may concern:*

Be it known that I, JAMES WHYEL, a citizen of the United States, residing at Pittsburgh, in the county of Allegheny and State of Pennsylvania, have invented certain new and useful Improvements in Tractor Brakes, of which the following is a specification.

This invention relates to brakes for gasoline tractors, and the primary object of the invention is to provide a brake by which the movements of the tractor, due to gravity or momentum, may be arrested and controlled.

Further objects of the invention are to provide a device of the character described, in a manner as hereinafter set forth, which is simple in its construction and arrangement, strong, durable and efficient in its use, automatically operable, inexpensive to manufacture, and which may be readily installed on a tractor without changing the construction of the latter.

To the accomplishment of these and such other objects as may hereinafter appear, the invention consists of the novel construction, combination, and arrangement of parts herein specifically described and illustrated in the accompanying drawing, wherein is shown an embodiment of the invention, but it is to be understood that changes, variations, and modifications may be resorted to which come within the scope of the claims hereunto appended.

In the drawing forming a portion of this specification and wherein like numerals of reference designate corresponding parts throughout the several views:

Figure 1 is a side view showing my improved brake mechanism in position upon a tractor, portions of the latter being broken away.

Figure 2 is an enlarged detail view of the device and associated parts with portions shown in section.

Figure 3 is a view on line III—III, Figure 2.

Figure 4 is a side elevation of the hand operating lever.

Referring to the drawing, wherein the application of my invention is illustrated in connection with a tractor, 1 denotes the worm wheel housing and 2 the rear axle housing, the latter being secured to the former by a plurality of bolts 3.

The worm 4, in engagement with the lower portion of the worm wheel 5, carries the large transmission gear 6 on its forward end. The gear 6 is formed with a rearwardly extending hub 7 having a tapered end 8.

Fixedly mounted on the worm 4 by means of the key 9 is a brake drum 10 having a central bore 11. The forward end of the drum 10 is formed with an enlarged tapered bore 12 which overlaps the tapered end 8 of the hub 7.

A brake band 13 encircles the periphery of the brake drum 10 and has its free ends formed to provide vertical lugs 14. Each of the lugs 14 is provided with an aperture 15 in horizontal alinement relative to each other. A replaceable brake lining 16 of any suitable material is carried on the inner face of the brake band 13. Extending transversely through the worm wheel housing 1, is a shaft comprising two sections 17 and 18, respectively. The shaft section 17 is formed with a reduced inner portion 19 which passes through the apertures 15 in the brake band lugs 14 and which is slidably and rotatably supported in the bore 20 formed in the inner portion of the shaft section 18. The shoulder 21 formed on the shaft section 17 abuts against the outer face of one of the lugs 14, while the inner end 22 of the shaft section 18 abuts against the outer face of the other lug.

The outer end of the shaft section 17 is formed with screw threads 23 which are engaged by the threaded bore 24 of the bearing 25. The bearing 25 is secured to the outer face of the axle housing 2.

The outer end of the shaft section 18 is formed with the screw threads 26 which are engaged by the threaded bore 27 of the bearing 28. The bearing 28 is secured to the outer face of the left axle housing 2.

The threaded connections of the shaft sections 17 and 18 with their respective bearings are such that when either is turned in the clockwise direction, the shaft sections will move inwardly toward each other. The shaft sections operating independently of each other, the rotation of either of them in the clockwise direction will act to tension the band 13 on the drum 10, owing to the engagement of the shaft sections with respective lugs of the brake band.

The outer end of the shaft section 17 carries a forwardly projecting arm 29 fixed thereto. A connecting rod 30 pivotally connects the arm 29 with the clutch lever 31, as is indicated at 32 and 33. When the foot operated clutch lever 31 is depressed to release the clutch, in the usual manner, its connection through the rod 30 and arm 29 with the shaft section 17, will actuate the latter to tension the brake band 13 upon the drum 10. When the foot is removed from the clutch lever it automatically returns to the normal position carrying with it the rod 30 and arm 29 thereby actuating the shaft section 17 to release the band 13 upon the drum 10.

The bearing 28 is formed with a vertical sector 34 having a rim provided with teeth 35. A vertically disposed hand operated lever 36 is fixed to the outer end of the shaft section 18. A spring controlled hand operated catch 37 is carried by the lever 36 and engages the teeth 35 of the sector 34.

When the lever 36 is moved rearwardly the shaft section 18 will be actuated to tension the band 13 upon the drum 10, and when moved forwardly release said tension.

The brake mechanism when operated by the lever 36 may be set to hold the band 13 tensioned on the drum 10, but when operated through the clutch lever 31 its release is automatic.

The function of the lever 36 is primarily intended to permit of the adjustment of the shaft sections relative to each other, that is, to so adjust the shaft section 18, that the operation of the shaft section 17 through the clutch lever 31 will function properly to tension the band upon the drum. It will be obvious, however, that the lever 36 may be successfully employed as an emergency brake, or under conditions when it is desired to lock the band 13 in the tensioned position.

A tractor with my improved brake mechanism may be brought to a stop quickly, thereby preventing the damage to the farm machinery, etc., which occurs in many instances when the tractor is carried forward by momentum or gravity.

What I claim is:

1. A brake for a tractor comprising a brake drum adapted to be mounted on the transmission worm of the tractor, a band encircling the drum and provided with a pair of lugs, a shaft formed of a pair of telescopic sections, one of said sections extending through said lugs, and means whereby either of said sections can be actuated to tension the band with respect to the drum.

2. A tractor brake comprising a brake drum mounted on the worm of the tractor driving mechanism, a brake band encircling said drum, a rotatable member engaging said band, means attached to the clutch lever of the tractor for actuating said member for tensioning said band on said drum and for automatically releasing said tension, means for maintaining said band in tensioned position on the drum, and means for adjusting said band with respect to the drum.

In testimony whereof I affix my signature.

JAMES WHYEL.